United States Patent
May et al.

(10) Patent No.: US 6,745,369 B1
(45) Date of Patent: Jun. 1, 2004

(54) BUS ARCHITECTURE FOR SYSTEM ON A CHIP

(75) Inventors: Roger May, Bicester (GB); James Tyson, Burnham (GB); Edward Flaherty, Kingston Bagpuize (GB); Mark Dickinson, Brill (GB)

(73) Assignee: Altera Corporation, San Jose, CA (US)

( * ) Notice: Subject to any disclaimer, the term of this patent is extended or adjusted under 35 U.S.C. 154(b) by 473 days.

(21) Appl. No.: 09/668,665

(22) Filed: Sep. 22, 2000

Related U.S. Application Data

(60) Provisional application No. 60/211,094, filed on Jun. 12, 2000.

(51) Int. Cl.[7] .............................................. G06F 15/76
(52) U.S. Cl. ............................................. 716/1; 713/501
(58) Field of Search ................................. 713/500, 501; 716/1, 17

(56) References Cited

U.S. PATENT DOCUMENTS

| | | |
|---|---|---|
| 5,309,046 A | 5/1994 | Steele |
| 5,671,400 A | 9/1997 | Kiggens et al. |
| 5,721,882 A | 2/1998 | Singh |
| 5,758,131 A | 5/1998 | Taylor |
| 5,835,752 A | 11/1998 | Chiang et al. |
| 5,892,961 A | 4/1999 | Trimberger |
| 5,978,869 A | 11/1999 | Guthrie et al. |
| 6,033,441 A | 3/2000 | Herbert |
| 6,034,542 A | 3/2000 | Ridgeway |
| 6,064,626 A | 5/2000 | Stevens |
| 6,078,976 A | 6/2000 | Obayashi |
| 6,088,751 A | 7/2000 | Jaramillo |
| 6,134,167 A | 10/2000 | Atkinson |
| 6,279,058 B1 | 8/2001 | Gulick |
| 6,311,255 B1 | 10/2001 | Sadana |
| 6,564,280 B1 | 5/2003 | Walsh |

OTHER PUBLICATIONS

"Triscend E5 CSoC Expands Market Reach,"2000, 2 pgs.
Roger May et al., "FPGA Configuration Data Manipulation," *Technical Developments*, Motorola, Sep. 1999, p. 80.
"Chip Count Is Cut For Baseband Processing," Nick Flaherty, *Electronics Times*, May 22, 2000, No. 995, p. 16.
"Chameleon's Approach," Chris Edwards, *Electronics Times*, May 22, 2000, No. 995, p. 16.
Alan McKenzie, et al.: "A Versatile Application Bootload for Field Programmable SOC" *Motorola Technical Developments* vol. 39, pp. 77–79, Sep. 1999.
"AT94K Series Field Programmable System Level Intergrated Circuit: Advance Information", *Atmel Corp.* 1999.
"CS2000 Reconfigurable Communications Processor Family Product Brief" *Chameleon Software Inc.*, pp. 1–8, 2000.
"Wireless Base Station Design Using Reconfigurable Communications Processors", *Chameleon Software Inc.*, pp. 1–8, 2000.
"Triscend E5 Configurable System–on–Chip Family" *Triscend Corporation*, pp. 1–90, 2000.

Primary Examiner—Thomas M. Heckler
(74) Attorney, Agent, or Firm—O'Keefe, Egan & Peterman, LLP

(57) ABSTRACT

A multiple bus architecture for a system on a chip including bridges for decoupling clock frequencies of individual bus masters from peripherals they are accessing. Each bridge interfaces to all bus masters in the system that require access to the peripherals it interfaces to.

24 Claims, 6 Drawing Sheets

BUS ARCHITECTURE FOR SYSTEM ON A CHIP

CROSS-REFERENCES TO RELATED APPLICATIONS

This application claims priority from provisional U.S. patent application Ser. No. 60/211,094, filed Jun. 12, 2000 and which is incorporated by reference into this application for all purposes.

A related patent application is filed concurrently with the present application as U.S. patent application Ser. No. 09/668,704, filed on Sep. 22, 2000, in the names of May et al., and entitled "Setting Up Memory and Registers from a Serial Device" and assigned to the present assignee. Another related patent application is filed concurrently with the present application as U.S. patent application Ser. No. 09/668,202, filed on Sep. 22, 2000, in the names of May et al., entitled "Re-configurable Memory Map for a System on a Chip," and assigned to the present assignee.

BACKGROUND OF THE INVENTION

The present invention relates to digital systems. More specifically, the present invention relates to a bus architecture for an integrated digital system.

Since their inception, digital systems have progressed towards higher levels of integration. Higher integration offers several benefits to the system designer, including lower development costs, shorter design cycles, increased performance and generally lower power consumption. At the device level, this integration has been achieved by the accumulation of functions once performed by multiple, individual devices into more capable, higher density devices. Additionally, the need for design flexibility has increased due to more challenging time-to-market pressures and changes in system specifications.

Often at the heart of a digital system is the microprocessor, also known as a CPU. A microprocessor is an integrated circuit implemented on a semiconductor chip, which typically includes, among other things, an instruction execution unit, register file, arithmetic logic unit (ALU), multiplier, etc. Microprocessors are found in digital systems, such as personal computers for executing instructions, and can also be employed to control the operation of most digital devices.

Microprocessors have evolved, most notably, in two directions. The first is towards higher performance and the second is towards greater ease of use. The path to higher performance has produced microprocessors with wider data paths and longer instructions. Greater integration has also improved speed, as many microprocessors now incorporate on-board structures such as memory for caching. Finally, like all semiconductors, microprocessors have benefited from architectural and process enhancements, allowing higher speed through better clock rates and more efficient logic operations.

Another digital device, which has evolved over its lifetime to meet the needs of system designer is the programmable logic device (PLD). A programmable logic device is a logic element having a logic function, which is not restricted to a specific function. Rather, the logic function of a PLD is programmed by a user. PLDs provide the advantages of fixed integrated circuits with the flexibility of custom integrated circuits. Demands for greater capacity and performance have been met with larger PLD devices, architecture changes, and process improvements. Similar to microprocessors, the road to greater integration has also led to memory structures being incorporated into PLD architectures.

The traditional approach to system design involves combining a microprocessor and other off-the-shelf devices on a board, while partitioning the board's functions into the components that are best suited to perform them. While this method seems to be straightforward, it ignores the advantages to be gained by higher device-level integration. With higher device-level integration, the elimination of on-chip/off-chip delays enhances performance. Power consumption and overall manufacturing and design costs are often improved as well. Yet, integration presents problems of its own. For example, since a microprocessor will normally be clocked at a faster rate than other elements, a method and apparatus are needed to address this difference in clock speeds.

SUMMARY OF THE INVENTION

According to an embodiment of the present invention a system, which is integrated on a single chip, is disclosed. The system includes a combination of an embedded processor, reprogrammable memory, a programmable logic device (e.g. a PLD) and a multiple bus architecture including bus bridges that allow communication between adjacent clock domains, yet which allow communication among the PLD, reprogrammable memory, processor, etc.

The bus architecture of the present invention, in particular, is embodied as a multiple bus master system, which allows communication among all peripherals in the system, via bridges that de-couple the clock frequencies of the individual bus masters from the peripheral they are accessing. The bus architecture of the present invention, therefore, allows the system components, for example the processor peripherals, and PLD to run at their optimal speeds.

In a first aspect of the invention a digital system integrated on a semiconductor chip is disclosed. The system includes one or more first bus masters coupled to a first bus in a first clock domain, a PLD coupled to a second bus in a second clock domain. A first bridge is coupled between the first and second buses and is operable to de-couple the first clock domain from the second clock domain. Additionally, one or more masters on the first bus are configured to communicate with one or more slaves on the second bus. The second bus may also contain a number of masters, including the PLD.

In a second aspect of the invention, a digital system on a semiconductor chip includes a central processing unit coupled to a first bus, a programmable logic device coupled to a second bus and a bus bridge coupled between the first and second buses. In this aspect of the invention, the first bus operates within a first clock domain and the second bus operates within a second clock domain.

In a third aspect of the invention, a digital system on a semiconductor chip includes a central processing unit (CPU) coupled to a first bus in a first clock domain defined by a first bus clock frequency; a plurality of electronic devices coupled to a second bus in a second clock domain defined by a second bus clock frequency; a bus bridge coupled between the first and second buses and operable to allow communication between the CPU at the first bus clock frequency and one of the plurality of electronic devices at the second bus clock frequency; a programmable logic device (PLD) coupled to a third bus in a third clock domain; and a PLD bridge coupled between the second and third buses.

The following detailed description and the accompanying drawings provide a better understanding of the nature and advantages of the present invention.

DESCRIPTION OF THE SPECIFIC EMBODIMENTS

Figure 1:
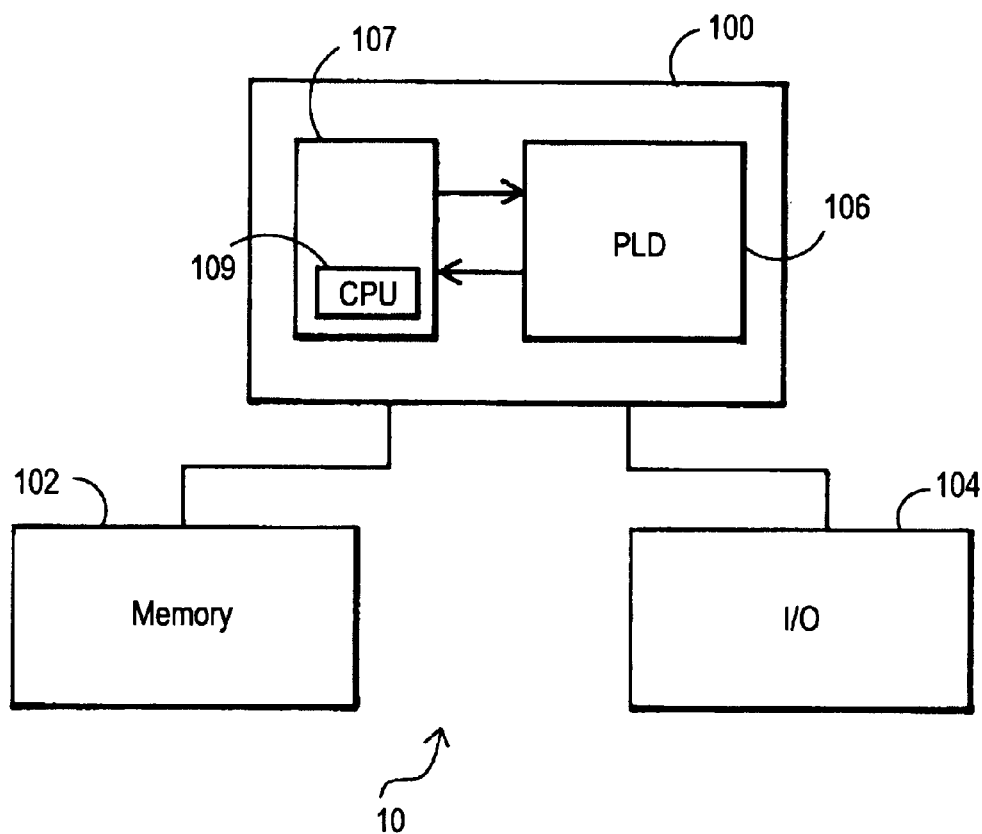
FIG. 1 is diagram of a digital system with a programmable logic integrated circuit.

FIG. 1 shows a block diagram of a digital system within which the present invention may be embodied. The system may be provided on a single board, on multiple boards, or even within multiple enclosures. FIG. 1 illustrates a system 10 in which a programmable logic device 106 may be utilized. Programmable logic devices are currently represented by, for example, Altera's MAX®, FLEX®, and APEX™ series of PLDs.

In the particular embodiment of FIG. 1, a semiconductor device 100 is coupled to a memory 102 and an I/O 104 and comprises a programmable logic device (PLD) 106 and embedded logic, which may include, among other components, a processor 109. The system may be a digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, and others.

Figure 2:
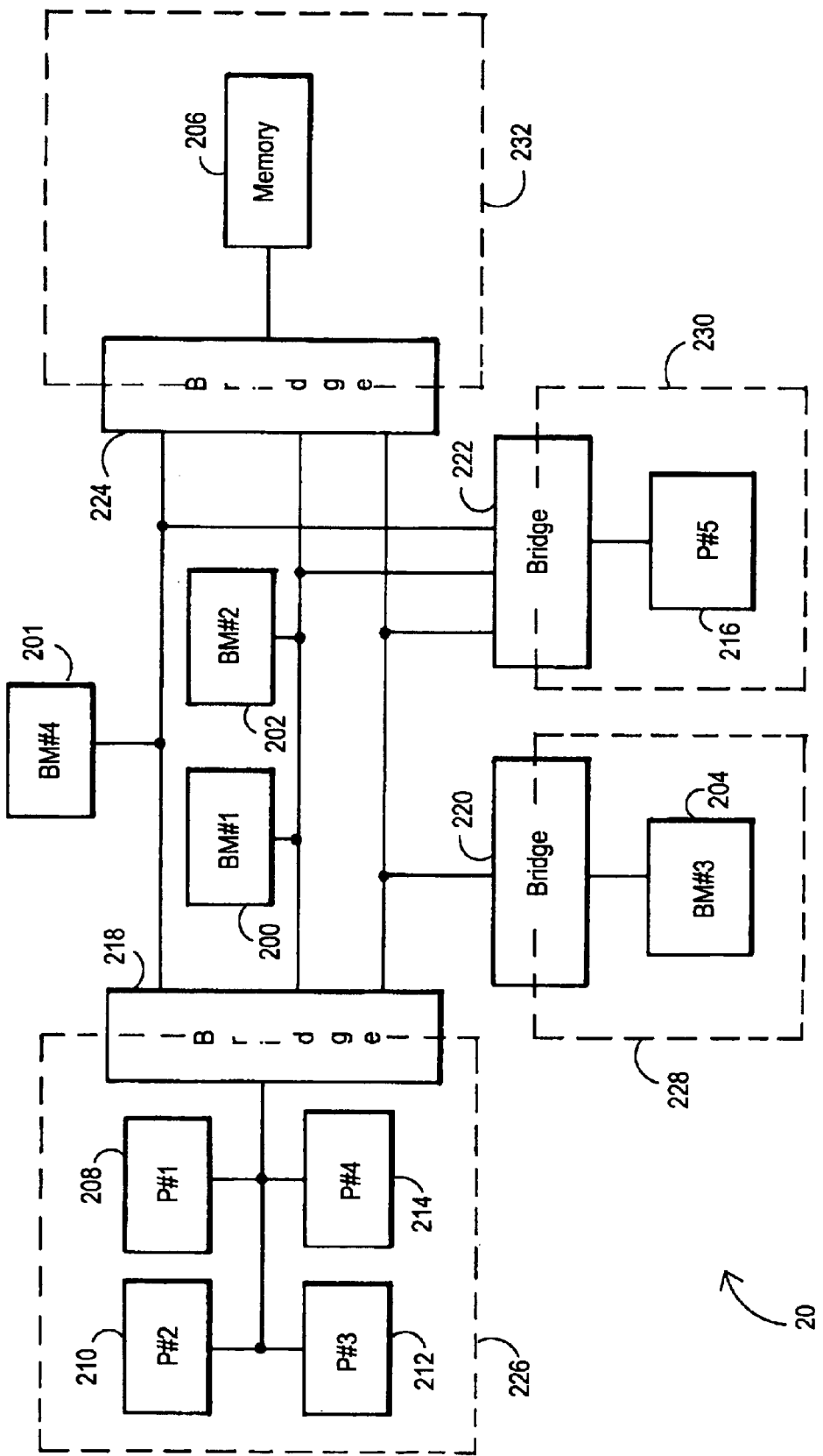
FIG. 2 is a block diagram of a digital system according to an embodiment of the present invention.

Referring now to FIG. 2, there is shown a diagram of a system 20 having a multiple bus architecture, according to an embodiment of the present invention. The bus architecture is comprised of bus masters 200, 201, 202 and 204, each of which can communicate with one or more of the peripherals in the system, e.g., memory 206, and other peripherals 208–216 such as, for example, I/O devices, etc., via bridges 218–224. The principle function of each bus master is to manage the bus it is associated with and control what devices can access the bus. Bridges 218–224 function to allow communication between a bus master in a first clock domain with a peripheral in a second clock domain, thereby allowing components on each bridge to operate at their individually optimal speeds. A bridge accomplishes this by preferably including a first-in first-out (FIFO) buffer, which accepts data at the clock rate of a first bridge and writes it out to a second bus at the clock rate of the second bus. So long as each bus master is accessing a different peripheral on a different bus, employment of bus bridges 218–224 leads to enhanced system performance, since multiple bus masters can communicate with different peripherals on different buses simultaneously without the problem of bus access contention. In other words, this embodiment of the present invention provides for the division of processing elements into their own clock domains 226–232 and provides bridges 218–224, which allow communication to other devices on buses across clock domains 226–232. Nevertheless, the bus architecture of system 20 is flexible enough to accommodate multiple bus masters, e.g. bus masters 200 and 202, sharing the same bus. The only condition is that the bus masters run at the same frequency. Each clock domain can derive from independent clock sources or derive from a division of one or more clock sources. Whereas the embodiment in FIG. 2 is shown to have a certain number of bus masters and peripheral devices, it should be realized that this number is merely exemplary and that a design having any number of bus master, buses, bridges and peripherals is possible and, therefore, within the scope of the present invention.

Figure 3:
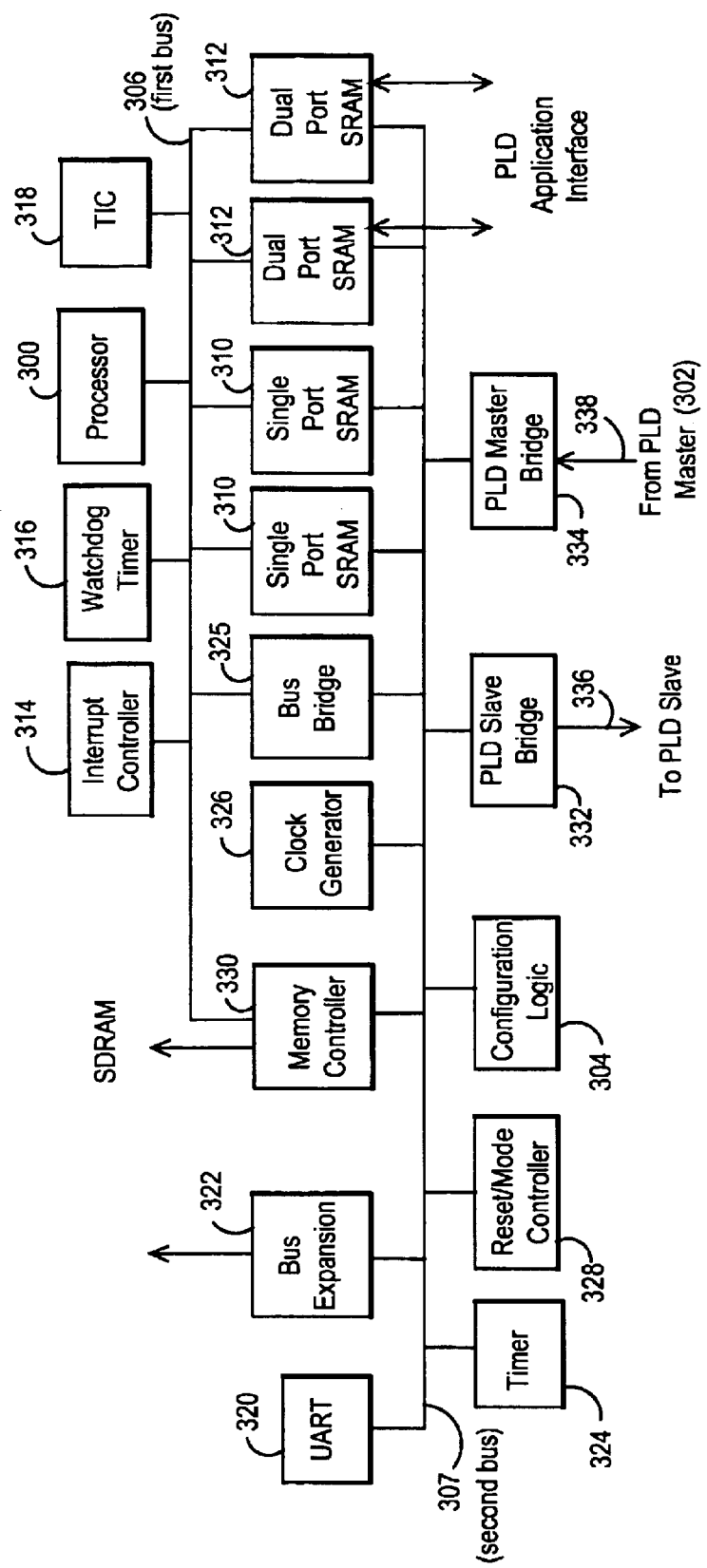
FIG. 3 is a block diagram of a system having a multiple bus architecture according to an embodiment of the present invention.

FIG. 3 shows a portion of embedded logic illustrating an exemplary implementation of the multiple bus architecture shown in FIG. 2. Access to a peripheral is controlled by a number of bus masters connected by a bus structure comprised of two or more buses, and which is described in greater detail below. In this exemplary implementation, there are three bus masters, including processor 300, PLD Master 302 and Configuration Logic 304. These bus masters 300–304 are capable of initiating read and write operations by providing address and control information. Processor 300 is connected to a first bus 306 (e.g. a 32-bit AHB bus). First bus 306 also connects to one or more peripheral devices such as a synchronous dynamic random access memory (SDRAM) controller 330, on-chip static random access memory (SRAM) (single 310 and dual 312 port), processor only peripherals, for example, an interrupt controller 314 for receiving an interrupt signal from another peripheral and reporting the signal to the processor 300, and a watchdog timer 316, which functions to cause the system to reset if, for example, certain logic states within processor 300 do not toggle within a predefined time period. A test interface controller (TIC) 318 can also be connected to first bus 306 for functional testing.

The remaining bus masters, which in this example are PLD Master 302 and Configuration Logic 304, share a second bus 307. Second bus 307 can be, for example, a standard 32-bit AHB bus that can provide for a lower memory access speed, by PLD Master 302 and Configuration logic 304, than may be required for processor 300, which is, as described above, connected to first bus 306. Similarly, peripherals that can be accessed with a relatively larger degree of latency tolerance can be connected to second bus 307. Some of the modules connected to second bus 307 may include, for example, a universal asynchronous transceiver (UART) 320, a bus expansion 322, a timer 324, clock generator 326, a reset/mode controller 328, an SDRAM memory controller 330 for controlling external SDRAM, and single and dual on-chip static random access memories (SRAMs) 310 and 312. Bus expansion 322 is used primarily to connect to external memory, for example, Flash memory from which processor 300 can boot. Clock generator 326 is preferably programmable so that a desired clock frequency can be set for second bus 307. Both single 310 and dual 312 SRAMs may be divided into multiple blocks (e.g. divided in two, as in FIG. 4), each having their own bus arbitration. Division permits concurrent access to different blocks by bus masters on first 306 and second 307 buses. Second bus 307 is also connected to a PLD slave bridge 332 and a PLD master bridge 334, each of which is interfaced to a PLD in the system (not shown in FIG. 3), via third 336 and fourth 338 buses, respectively. Third 336 and fourth 338 buses can be, for example, standard 32-bit AHB buses. (Alternatively, a bridge to and from the PLD may be configured in a single device.) In this particular embodiment, the PLD may be, for example, an APEX™ 20KE, which is manufactured by Altera Corporation and described in *Altera Data Book* (1999), which is incorporated by reference.

Figure 4:
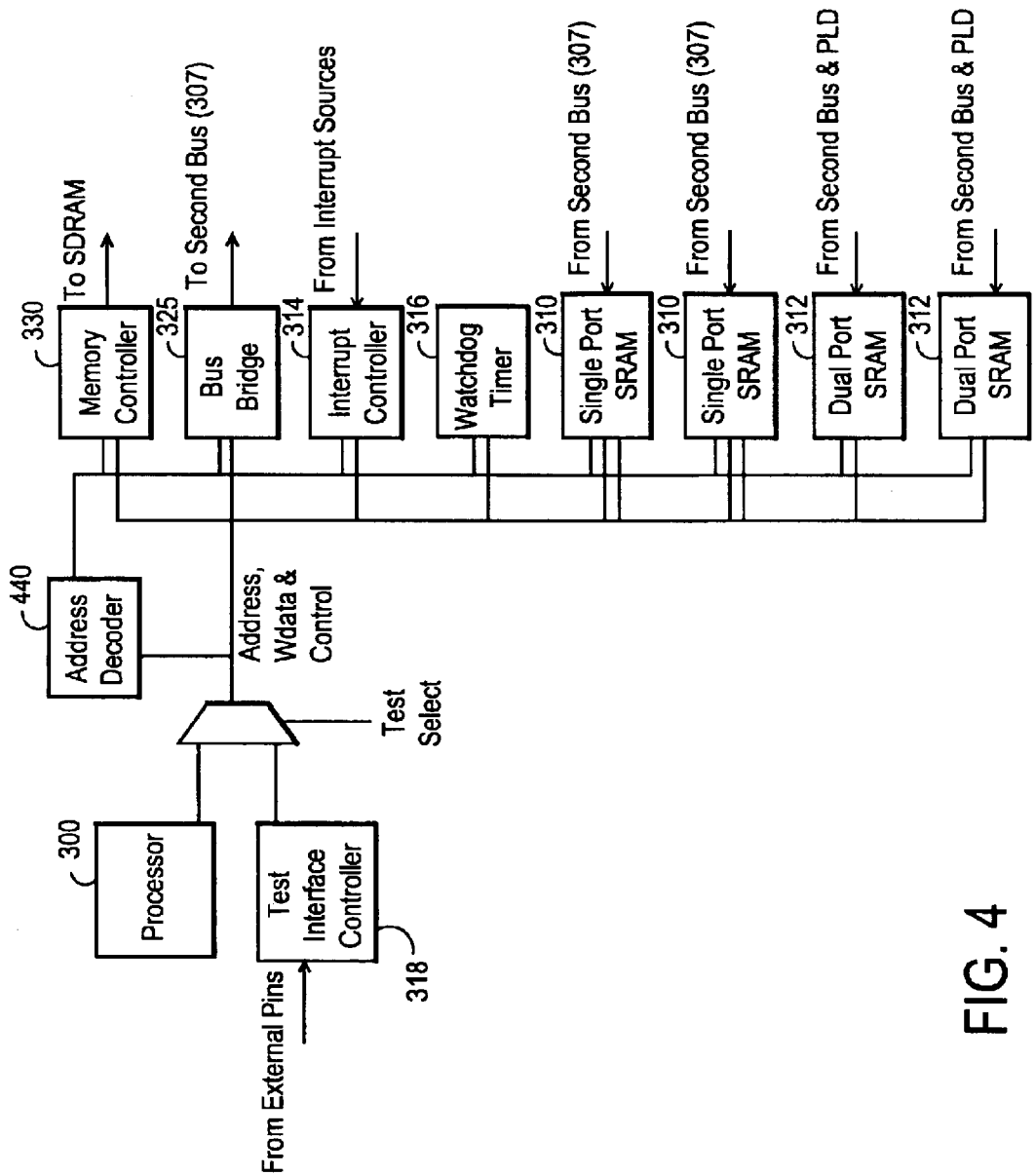
FIG. 4 shows a more detailed and exemplary diagram of a first bus in FIG. 3, and its connectivity to exemplary components and peripherals, according to an embodiment of the present invention.

FIG. 4 shows first bus 306 in greater detail. First bus 306 is clocked by, for example, a dedicated phase locked loop (PLL), which allows the maximum possible performance to be achieved by processor 300. The clock frequency can be made selectable by writing to clock generator module 326. An address decoder 440 provides selection of bus bridge 325, SDRAM memory controller 330, on-chip SRAM 310 and 312, interrupt controller 314 and watchdog timer 316 in accordance with memory maps of the various modules. Address decoder 440 selects one of these elements by comparing address information encoded in memory map registers (not shown in FIG. 3) on second bus 307 to an address output by processor 300. If the address output by processor 300 is within an address range of any one of the elements on first bus 306, then a select line for the corresponding element is activated. If access is not being made for elements coupled exclusively to first bus 306 (e.g. memory controller 330, interrupt controller 314, watchdog time 316) or for SRAM 310 or 312, then access is directed to an element on second bus 307 via bus bridge 325.

Figure 5:
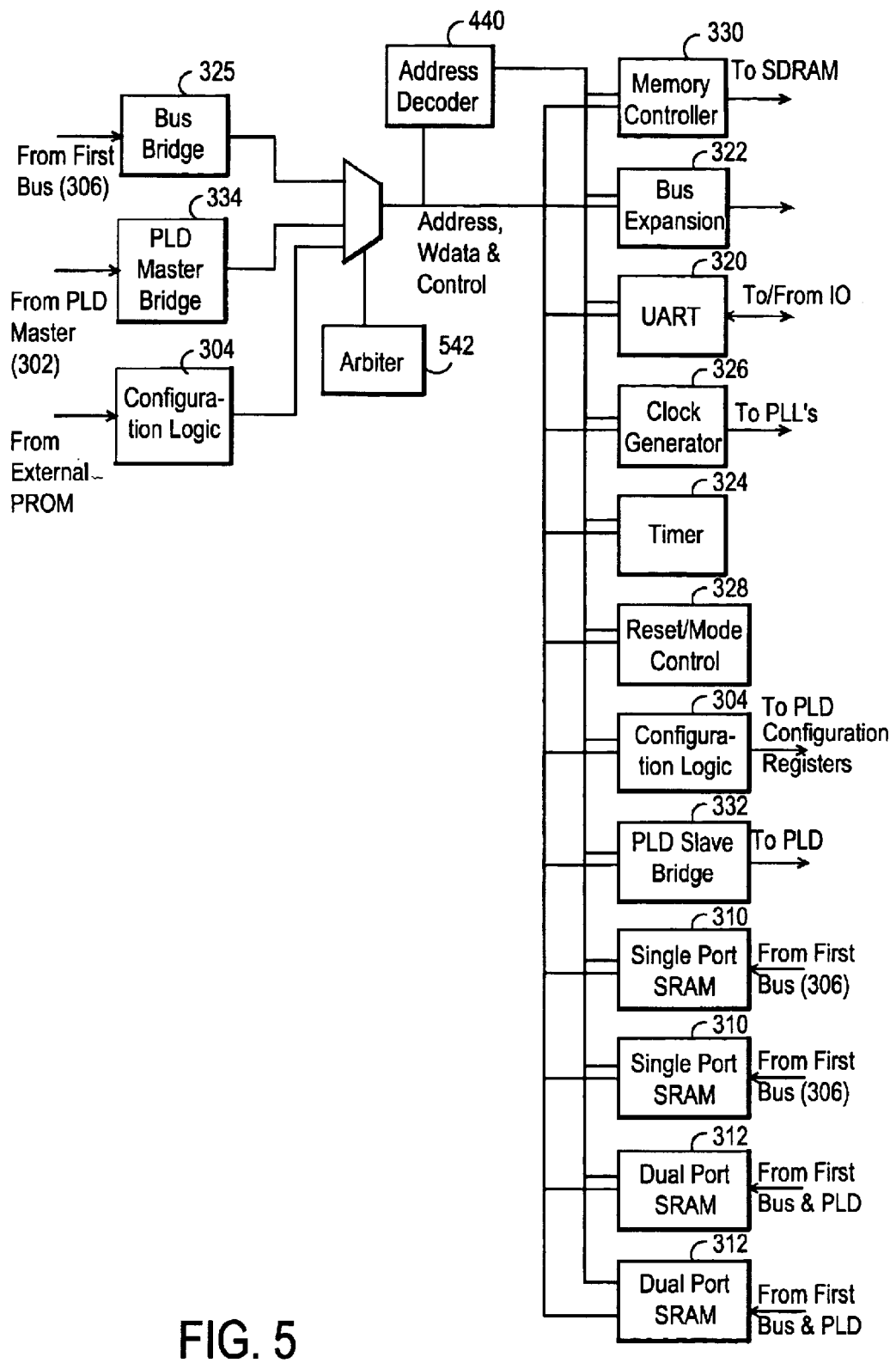
FIG. 5 shows a more detailed and exemplary diagram of a second bus in FIG. 3, and its connectivity to exemplary components and peripherals, according to an embodiment of the present invention.

FIG. 5 shows second bus 307 from FIG. 2 in greater detail. Second bus 307 may be clocked by, for example, a divided down version of the clock that clocks first bus 306 or may be a clock unrelated to the first bus clock. A register for selection of this frequency is located within clock generator module 326. Address decoder 340 provides for selection of SDRAM memory controller 330, bus expansion 322, on-chip SRAM 310 and 312, UART 320, clock generator 326, timer 324, reset/mode control 328, PLD slave bridge 332, etc. according to the system's memory map. Reset/mode controller 328 functions to reset the system and control its mode of operation. It may also contain memory map registers a user can access to configure a memory map for the system. Second bus 307 also includes an arbiter 542 for determining which bus master, PLD master 302 or configuration logic 304 or bus masters on first bus 306 (via bus bridge 325) has access to second bus 307.

Figure 6:
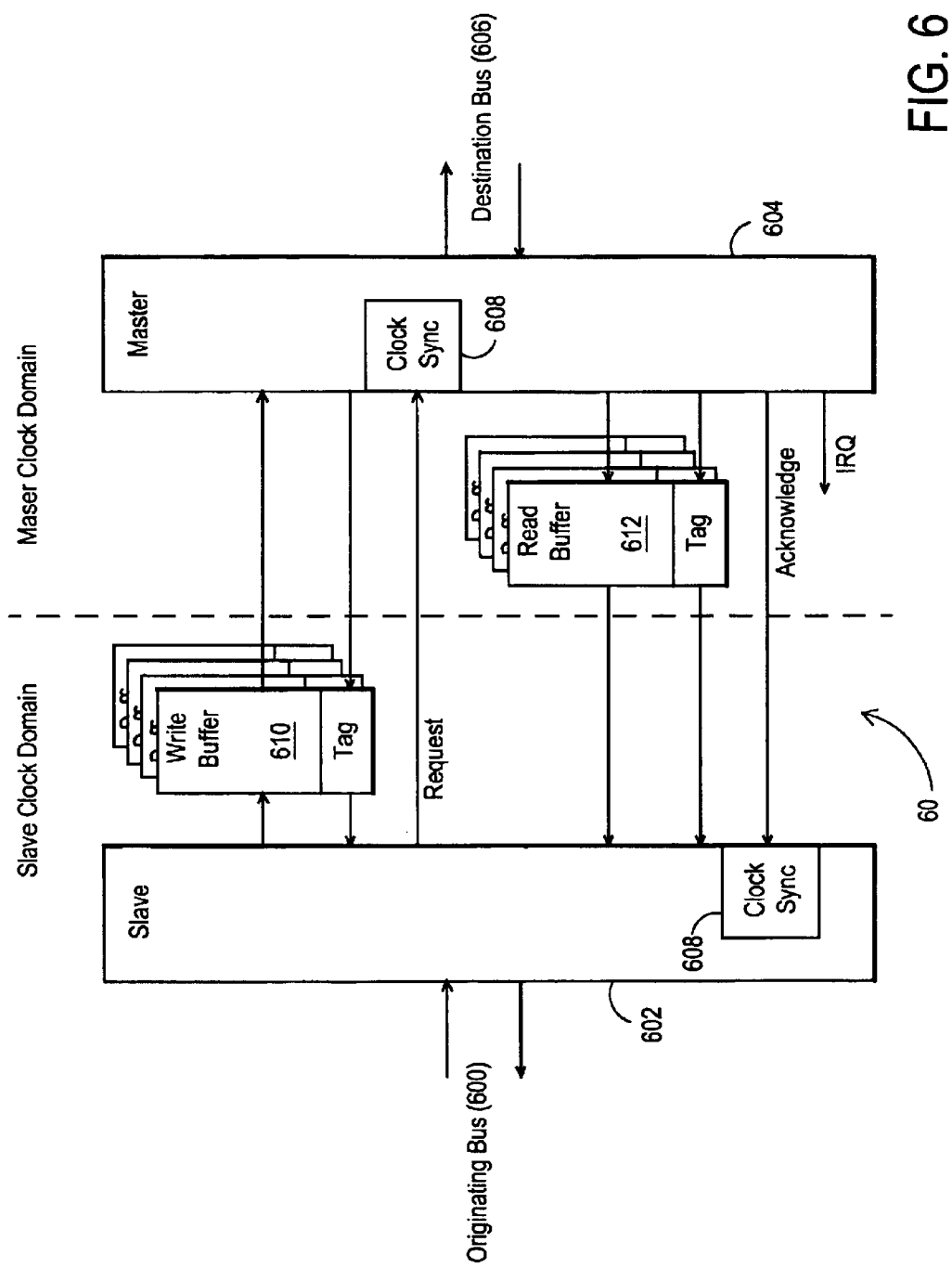
FIG. 6 shows an exemplary block diagram of a bridge according to an embodiment of the present invention.

First 306 and second 307 buses are coupled to each other by bus bridge 325. PLD master 334 and slave 332 bridges are substantially identical with bus bridge 325 with only minor differences related to the chosen address decoding scheme and bus structure. An exemplary embodiment of a bridge 60 is shown in FIG. 6. An originating bus 600 of a transaction is connected to that bridge's slave 602 while that bridge's master 604 is connected to a destination bus 606. Bridge 60 includes synchronization logic 608, which allows the master and slave interfaces to reside in different clock domains. The master and slave interfaces of bridge 60 can be synchronous or asynchronous relative to each other. If synchronous, bridge 60 can be configured to bypass synchronization logic 608 to reduce the latency through bridge 60.

A write buffer 610 is configured to accept bursts of posted write data from slave interface. Preferably, the bus protocol allows for several transfers of write data to be concatenated to enhances bus performance. No wait states are inserted so long as a buffer entry is free to accept the data. A write request is generated by slave interface and is synchronized to the master clock domain. Master 604 de-queues data from write buffer 610, writes it out to destination bus 606 and then asserts an acknowledge signal to slave 602 to indicate that a buffer entry is now free for re-use by slave 602. Sending an acknowledge signal back to slave 602 accounts for the difference in clock frequencies in the slave and master clock domains. Without write posting, for example, if master 604 is processor 300 on first bus 306 and slave 602 is one of the slaves on second bus 307, as in FIG. 3, processor would have to wait for each single transfer to complete before it send the next transfer. Since processor 300 will normally run at a higher frequency than slaves on second bus 307, write posting allows the processor 300 to run at its optimal speed. In an exemplary embodiment, write posting is controlled by action of the bridge coupled between the two buses. Preferably, each bridge includes a first-in first-out (FIFO), which accepts data at the clock rate of the first bridge, buffers it and writes it out to the second bus at the clock rate of the second bus. The FIFO thereby allows processor 300, for example, to carry out its next action at its own optimal clock rate and is not stalled by having to wait for data to be written to the second bus 307.

When selected by a read transaction, slave 602 asserts a read request that is synchronous to the master clock domain. Master 604 performs a read transaction (pre-fetching data to fill a read buffer 612 if enabled) and asserts an acknowledge signal to indicate when data is available. Read buffer tags are used to return the status of the transaction (e.g. OK, ERROR, RETRY).

Slave interface also provides access to a bridge status register and address status register (not shown in FIG. 6). These registers contain information pertaining to a posted write transaction that resulted in an ERROR response, could not arbitrate for the destination bus, or could not complete an access that had a RETRY response. When slave 602 indicates that a transfer is pending, master 604 uses the address and control information to perform the requested transaction on destination bus 606. Master 604 will only read data from destination bus 606 if there is a free entry in read buffer 612 to receive it. If no free entries are available, then master 604 will insert BUSY cycles. Similarly, if no data is available from write buffer 610 during a write transaction, master 604 will insert BUSY cycles.

In conclusion, the present in invention discloses a bus architecture of the present invention, in particular, is embodied as a multiple bus master system, which allows communication among all peripherals in the system via bridges that de-couple clock frequencies of the individual bus masters from the peripheral they are accessing. The bus architecture of the present invention, therefore, allows various system units to run at their optimal speeds and reduces bus contention.

The foregoing description of preferred exemplary embodiments has been presented for the purposes of description. It is not intended to be exhaustive or to limit the invention to the precise form described herein, and modifications and variations are possible in light of the teaching above. Accordingly, the true scope and spirit of the invention is instead indicated by the following claims and their equivalents.

What is claimed is:

1. A digital system integrated on a semiconductor chip, comprising:
    one or more first bus masters coupled to a first bus in a first clock domain;
    a programmable logic device coupled to a second bus in a second clock domain;
    a first bridge coupled between the first and second buses operable to de-couple the first clock domain from the second clock domain.

2. The system of claim 1, wherein one of the first bus masters comprises a central processing unit.

3. The system of claim 1, wherein the one or more first bus masters are configured to communicate with one or more second bus slaves coupled to the second bus, via the first bridge.

4. The system of claim 1, wherein the programmable logic device comprises a second bus master.

5. The system of claim 4, further comprising a second bus bridge coupled between the second bus and the second bus master.

6. The system of claim 1, further comprising a plurality of second bus masters coupled to the second bus.

7. A digital system on a semiconductor chip, comprising:
   a central processing unit (CPU) coupled to a first bus;
   a programmable logic device (PLD) coupled to a second bus; and
   a bus bridge coupled between the first and second buses.

8. The digital system of claim 7, wherein the first bus operates within a first clock domain and the second bus operates within a second clock domain.

9. The digital system of claim 8, wherein the first clock domain is characterized by a first clock frequency that is greater than a second clock frequency characteristic of the second clock domain.

10. The digital system of claim 8, wherein either or both of the first clock frequency and second clock frequency are programmable.

11. A digital system on a semiconductor chip, comprising:
   a central processing unit (CPU) coupled to a first bus in a first clock domain defined by a first bus clock frequency;
   a plurality of electronic devices coupled to a second bus in a second clock domain defined by a second bus clock frequency;
   a bus bridge coupled between the first and second buses and operable to allow communication between the CPU at the first bus clock frequency and one of the plurality of electronic devices at the second bus clock frequency;
   a programmable logic device (PLD) coupled to a third bus in a third clock domain; and
   a PLD bridge coupled between the second and third buses.

12. A device comprising:
   a first circuit operable in a first clock domain;
   a first communication media coupled to the first circuit and configured to transfer information;
   a programmable logic device operable in a second clock domain;
   a second communication media coupled to the programmable logic device, wherein the second communication media is configured to transfer information; and
   a communication circuit coupled to the first and second communication media and configured to provide communication between the first circuit the programmable logic device.

13. The device of claim 12, wherein the device includes a plurality of circuits deposited on an integrated circuit.

14. The device of claim 12, wherein the first circuit is a processor.

15. The device of claim 12, wherein the first clock domain provides a first programmable clock frequency.

16. The device of claim 15, wherein the frequency of the first programmable clock frequency can be selectively programmed.

17. The device of claim 12, wherein the first communication media is a bus.

18. The device of claim 12, wherein the information includes data.

19. The device of claim 12, wherein the information includes control signals.

20. The device of claim 12, wherein the programmable logic device further includes:
   a plurality of logic cells having at least one programmable circuit arranged in a multiple dimensional array; and
   at least one interconnector coupled to the plurality of the logic cells and configured to transfer information between the plurality of the logic cells.

21. The device of claim 12, wherein the second clock domain includes a second programmable clock frequency.

22. The device of claim 21, wherein the first programmable clock frequency has the same frequency of the second programmable clock frequency.

23. The device of claim 12, wherein the communication circuit is a bus bridge.

24. The device of claim 23, wherein the bus bridge transfers the information between the first and second clock domains.

* * * * *